T. W. EVANS.
STOVE LID LIFTER.
APPLICATION FILED MAY 17, 1920.

1,411,240.

Patented Mar. 28, 1922.

UNITED STATES PATENT OFFICE.

THOMAS W. EVANS, OF PHILADELPHIA, PENNSYLVANIA.

STOVE-LID LIFTER.

1,411,240.  Specification of Letters Patent.  Patented Mar. 28, 1922.

Application filed May 17, 1920. Serial No. 382,069.

*To all whom it may concern:*

Be it known that I, THOMAS W. EVANS, a citizen of the United States, residing at Philadelphia, in the county of Philadelphia and State of Pennsylvania, have invented new and useful Improvements in Stove-Lid Lifters, of which the following is a specification.

This invention relates to a stove lid lifter and the principal object of the invention is to provide means for positively locking the lifter to the lid so that there is no danger of the lid dropping from the lifter.

Another object of the invention is to provide means for keeping the handle part of the lifter cool at all times.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of the device.

Figure 2 is a plan view with parts broken away.

Figures 3 and 4 are detail views of the lid and its opening.

In these views 1 indicates the lid on the stove which is provided with the opening 2 having the undercut part 3 and the holes 4 formed in the bottom wall of the opening. The lifter is formed of the handle part 5 and the shank plate 6. The lower part 7 of this plate is substantially flat while the other part is inclined. The end part 8 of the portion 7 is reduced in width and thickness to pass into the undercut portion 3 of the opening 2 in the lid and an upright flange 9 is formed at the junction of the part 8 with the part 7 to engage the edge of the upper wall of said undercut portion. The bottom of the lower part 7 is provided with the studs 10 which are adapted to engage with the holes 4 in the bottom of the opening. The inclined part 6 is provided with the holes 11 so as to keep the part cool. The upper end of the shank 6 is provided with the screw threaded reduced part 12 which is adapted to engage the screw threaded socket 13 formed in the lower part of the handle 5. If desired I may place a layer of asbestos 14 in said socket. The handle is of tubular form with its lower end closed and its upper end open but adapted to be closed by the screw cap 15. The handle is of slightly curved shape as shown in Figure 1. The handle is also covered with the layer of asbestos 16 which is held in place by the bands 17.

It will thus be seen that the lid is locked to the lifter by the studs 10 engaging the holes 4 and the reduced end of the lifter and its flange engaging the undercut portion of the opening. The handle is kept cool at all times by means of the perforated shank 6 and the asbestos covering. If the lifter is being used on an unusually hot stove, water may be placed in the hollow handle.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A stove lid lifter of the character described comprising a hollow handle, a shank having perforations formed therein, a lid engaging portion on the lower end of the shank part, said handle adapted to receive water for cooling the former, a screw threaded cap for said handle, a covering of asbestos provided for said handle, and bands provided on the handle for holding the asbestos thereon.

2. A stove lid lifter of the character described comprising a hollow handle, a perforated shank having screw threaded engagement with said handle, said plate having its lower portion flat and its remaining portion being inclined, the end of the lower portion being reduced in width and thickness to pass into the undercut portion of the opening formed in the lid of the stove, an upright flange provided at the juncture of the end portion with the lower portion.

In testimony whereof I affix my signature.

THOMAS W. EVANS.